(12) United States Patent
Simon et al.

(10) Patent No.: US 10,269,479 B2
(45) Date of Patent: Apr. 23, 2019

(54) MAGNET HAVING REGIONS OF DIFFERENT MAGNETIC PROPERTIES AND METHOD FOR FORMING SUCH A MAGNET

(71) Applicant: ABB Schweiz AG, Baden (CH)

(72) Inventors: Reinhard Simon, Baden (CH); Jacim Jacimovic, Wettingen (CH); Darren Tremelling, Raleigh, NC (US); Felix Greuter, Baden-Rütihof (CH); Erik Johansson, Västerås (SE); Tomaz Tomse, Ljubljana (SI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/430,621

(22) Filed: Feb. 13, 2017

(65) Prior Publication Data

US 2017/0154713 A1 Jun. 1, 2017

Related U.S. Application Data

(63) Continuation of application No. PCT/EP2015/068599, filed on Aug. 12, 2015.
(Continued)

(51) Int. Cl.
*H01F 7/02* (2006.01)
*B22F 3/105* (2006.01)
(Continued)

(52) U.S. Cl.
CPC .............. *H01F 7/02* (2013.01); *B22F 1/0003* (2013.01); *B22F 3/105* (2013.01); *B22F 3/1055* (2013.01); *B22F 7/06* (2013.01); *B23K 15/0086* (2013.01); *B23K 15/0093* (2013.01); *B23K 26/0006* (2013.01); *B23K 26/342* (2015.10);
(Continued)

(58) Field of Classification Search
None
See application file for complete search history.

(56) References Cited

U.S. PATENT DOCUMENTS 4,110,718 A * 8/1978 Odor .................... H01F 1/10
310/154.26
4,710,239 A * 12/1987 Lee ..................... H01F 1/0576
148/101

(Continued)

FOREIGN PATENT DOCUMENTS

CN 101752074 A 6/2010
EP 1879201 A1 1/2008
(Continued)

OTHER PUBLICATIONS

JP Abstract Translation of JP 2001-323343 A (Year: 2001).*
(Continued)

*Primary Examiner* — Kevin M Bernatz
(74) *Attorney, Agent, or Firm* — J. Bruce Schelkopf; Taft Stettinius & Hollister LLP

(57) ABSTRACT

This application concerns a magnet having a magnet body as well as a method for manufacturing such a magnet. The magnet body has a first region with first magnetic properties and a second region with second magnetic properties that are different to the first properties. Owing to the manufacturing process of the magnet body, the relative location of the first region and the second region within the magnet body is freely predeterminable.

30 Claims, 7 Drawing Sheets

Related U.S. Application Data

(60) Provisional application No. 62/036,449, filed on Aug. 12, 2014.

(51) Int. Cl.

| | |
|---|---|
| *H01F 1/08* | (2006.01) |
| *H01F 1/22* | (2006.01) |
| *H01F 41/02* | (2006.01) |
| *B22F 7/06* | (2006.01) |
| *C22C 38/00* | (2006.01) |
| *B33Y 10/00* | (2015.01) |
| *B33Y 80/00* | (2015.01) |
| *B23K 26/342* | (2014.01) |
| *B22F 1/00* | (2006.01) |
| *B23K 15/00* | (2006.01) |
| *B23K 26/00* | (2014.01) |
| *B28B 1/00* | (2006.01) |
| *C04B 35/26* | (2006.01) |
| *C04B 35/622* | (2006.01) |
| *C04B 41/52* | (2006.01) |
| *H01F 1/053* | (2006.01) |
| *B23K 103/02* | (2006.01) |

(52) U.S. Cl.
CPC .............. *B28B 1/001* (2013.01); *B33Y 10/00* (2014.12); *B33Y 80/00* (2014.12); *C04B 35/26* (2013.01); *C04B 35/62218* (2013.01); *C04B 41/52* (2013.01); *C22C 38/002* (2013.01); *C22C 38/005* (2013.01); *H01F 1/053* (2013.01); *H01F 1/086* (2013.01); *H01F 1/22* (2013.01); *H01F 41/02* (2013.01); *H01F 41/0253* (2013.01); *H01F 41/0293* (2013.01); *B22F 2003/1051* (2013.01); *B22F 2301/355* (2013.01); *B22F 2998/10* (2013.01); *B22F 2999/00* (2013.01); *B23K 2103/02* (2018.08); *C22C 2200/02* (2013.01); *C22C 2200/04* (2013.01); *C22C 2202/02* (2013.01); *Y02P 10/295* (2015.11)

(56) References Cited

U.S. PATENT DOCUMENTS

| | | | | |
|---|---|---|---|---|
| 6,800,145 | B2* | 10/2004 | Shimada | B82Y 25/00 148/101 |
| 8,021,769 | B2* | 9/2011 | Berger | G11B 5/65 428/826 |
| 9,818,516 | B2* | 11/2017 | Li | H01F 1/0577 |
| 2009/0020193 | A1* | 1/2009 | Ohta | H01F 1/0577 148/559 |
| 2009/0032147 | A1* | 2/2009 | Nozawa | B22F 3/11 148/302 |
| 2009/0123774 | A1* | 5/2009 | Nishiuchi | H01F 1/0573 428/566 |
| 2010/0108196 | A1* | 5/2010 | Ohta | C21D 8/1211 148/121 |
| 2012/0318412 | A1* | 12/2012 | Ohta | C21D 8/1211 148/548 |
| 2013/0309121 | A1 | 11/2013 | Prest et al. | |
| 2014/0132376 | A1* | 5/2014 | Jin | H01F 1/0552 335/302 |
| 2016/0141083 | A1* | 5/2016 | Ito | C22C 33/02 252/62.55 |

FOREIGN PATENT DOCUMENTS

| | | | |
|---|---|---|---|
| EP | 2565022 A1 | 3/2013 | |
| EP | 1970924 B1 | 6/2014 | |
| JP | 2001323343 A | * 11/2001 | ............ B82Y 25/00 |
| WO | 2013176116 A1 | 11/2013 | |
| WO | 2013185967 A1 | 12/2013 | |
| WO | 2014095200 A1 | 6/2014 | |

OTHER PUBLICATIONS

Patent Cooperation Treaty, International Search Report & Written Opinion issued in corresponding Application No. PCT/EP2015/068599, dated Nov. 20, 2015, 10 pp.

Gu et al., "Effects of dispersion technique and component ratio on densification and microstructure of multi-component Cu-based metal powder in direct laser sintering," Journal of Materials Processing Technology, vol. 182, 2007, pp. 564-573.

Hilzinger et al., "Magnetic Materials," Publicis Erlangen, Zweigniederlassung der PWW GmbH, 2013, p. 5.

Regenfuss et al., "Principles of Laser Micro Sintering," Laserinstitut Mittelsachsen e.V./Hochschule Mittweida, Mittweida, Germany, 15 pp.

"Additive Manufacturing Technology," Brochure, European Powder Metallurgy Association, 4 pp.

Murata, Takeshi, "Technologies to Reduce Heavy Rare Earth for Nd—Fe—B Sintered Magnet," Magnetic Materials Research Lab, NEOMAX Division, Hitachi Metals, Ltd., 17 pp.

"Higher performance for neodymium magnets HAL production process," Tech Journal, 2011, pp. 1-6.

Patent Cooperation Treaty, International Preliminary Report on Patentability issued in corresponding Application No. PCT/EP2015/068599, completed Oct. 27, 2016, 16 pp.

* cited by examiner

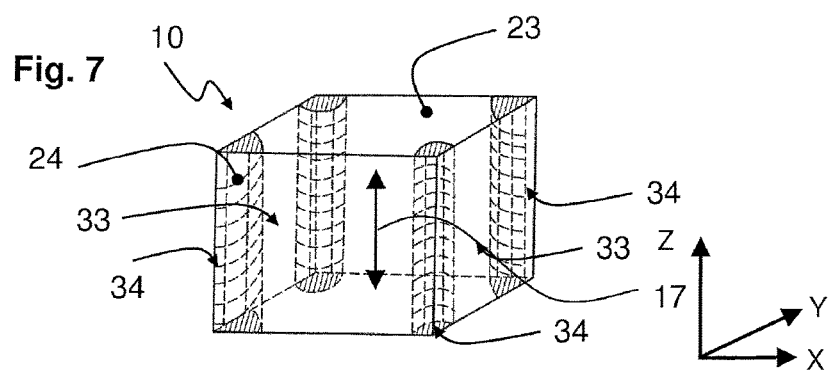
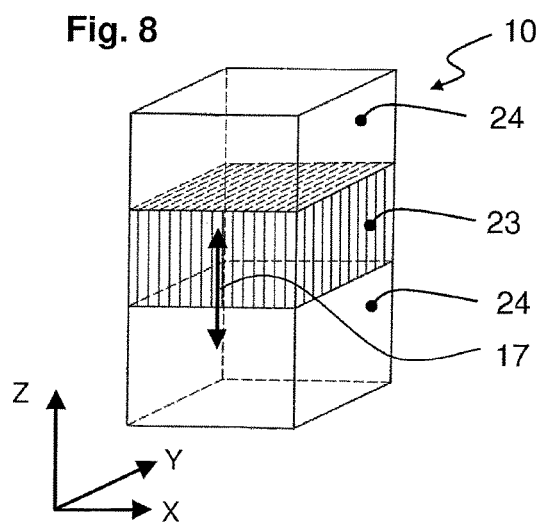
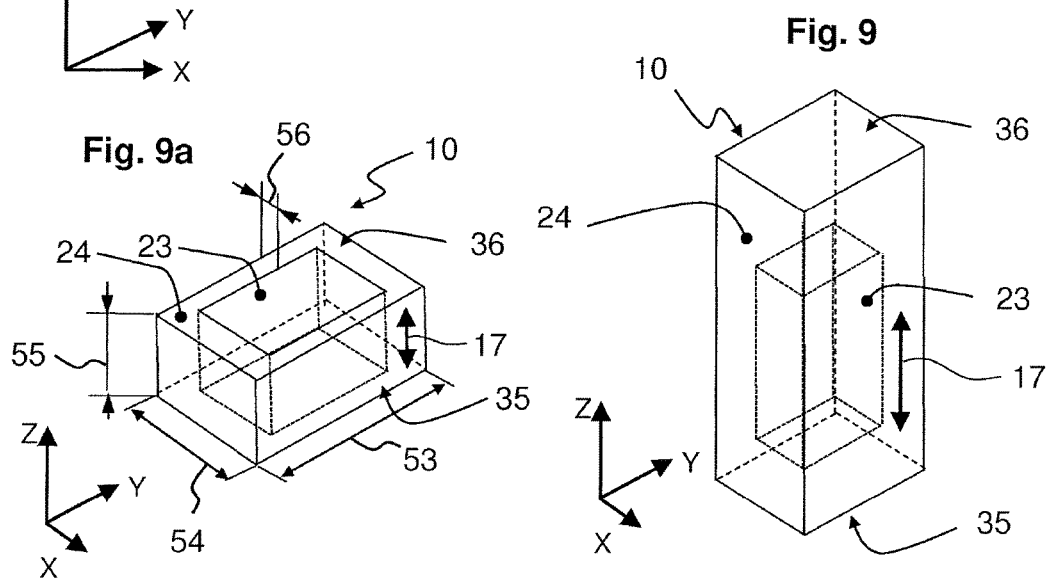

ID="1" />

MAGNET HAVING REGIONS OF DIFFERENT MAGNETIC PROPERTIES AND METHOD FOR FORMING SUCH A MAGNET

TECHNICAL FIELD

The present invention relates mainly to a magnet and to a method for forming such a magnet. Hereinafter, the term 'magnet' is understood as an object that is able to produce a magnetic field.

BACKGROUND ART

Magnetic materials for energy applications are usually divided into two main groups: hard magnets (often referred to as permanent magnets) and soft magnets.

Hard magnets typically have coercivity values Hc>10-100 kA/m, whereas for soft magnets typically the coercivity is Hc<1 kA/m. In between these groups the semi-hard magnetic materials include all alloys whose coercivity (Hc) is between that of soft magnetic and hard magnetic materials.

Permanent magnets (hereinafter abbreviated as "PM") are typically used in electrical machines (motors, generators). The most advanced permanent magnets today are based on rare earth (RE) metals. The term "rare earth" is commonly abbreviated as "RE". RE is one of the elements of the Lanthanide series in the periodic table of elements. Said Lanthanide series comprise the chemical elements Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb), Lutetium (Lu).

RE based magnets are especially important, as they allow machine designs with high performance, high energy efficiency, and overall compactness in dimension. Typical rare earth-based permanent magnets materials are intermetallic alloys based on Nd—Fe—B, (Nd—Dy)—Fe—B, and Sm—Co. A range of additional chemical elements can be present in the magnet bodies in order to optimize specific properties and also the ratios of the base elements can vary within one type of magnets.

Sintered, dense rare earth-based permanent magnets materials exhibit the highest magnetic performance, i.e. the highest coercivity Hc and the highest remanence $B_r$. A drawback of the rare earth-based permanent magnets materials resides in that they resides in that the rare earth elements used are that expensive that their share forms an essential portion of the total cost for manufacturing the magnet body. That disadvantage holds particularly true for those magnet bodies containing heavy rare earth elements (hereinafter referred to as HRE elements). HRE elements are Terbium (Tb), Dysprosium (Dy), Holmium (Ho), Erbium (Er), Thulium (Tm), Ytterbium (Yb) and Lutetium (Lu).

The high total cost depends not only on the high raw material costs of the rare earth metals, but also on the very complex processing route. Because of the high reactivity of RE metals with oxygen, all processing steps have to be performed under protective atmospheres in order to avoid detrimental impact on the magnetic properties. In order to achieve a maximum magnetic performance, particles can be oriented by applying a high magnetic field before and during the pressing step. Such manufactured magnets are usually higher in performance compared to non-oriented grades. All known powder metallurgy processing routes for RE-based permanent magnets are limited to the manufacture of very simple geometries, because the shaping is based on simple uniaxial die-pressing, isostatic pressing, or hot deformation in a uniaxial die-pressing step. Already very simple geometrical features, like a slightly curved surface instead of a flat surface, comes with a significant higher price of the magnet, because expensive additional machining steps (grinding of the hard materials) have to be employed. This limitation to simple geometries is a big limitation and drawback for the design of advanced, more energy efficient machines, which would profit form more complex shaped magnets.

Yet another important property of PM materials for electrical machine applications is there maximum operating temperature. RE based PM materials suffer from demagnetization at elevated temperatures. In the Nd—Fe—B system partial substitution of Nd with heavy rare earth elements (typ. 4 to 6 at. % Dy) can extend the operating temperature from typically 100° C. (for normal Nd—Fe—B) to about 150 to 200° C. (for Dy doped Nd—Fe—B). In advanced machine designs with increased power densities this extended operating temperature are commonly desired. However, the improved temperature stability comes with a high cost. Due to the exceptionally high cost of heavy RE metals, the cost of such Dy doped or other heavy RE doped magnets is significantly higher compared to conventional RE based PM.

A further problem of RE based PM materials is their intrinsically high susceptibility for corrosion. To enable long-term application, alloying elements for improved corrosion behavior or protective coatings have to be applied.

One way of overcoming this drawback resides in arranging the expensive HRE elements selectively in those areas of the magnet body where enhanced magnetic characteristics are actually required and indispensable once built in an electric device, while keeping the rest of the magnet essentially free of HRE.

One approach of lowering the overall costs of a magnet by selective provision of RE elements resides in diffusing Dysprosium (Dy) along the grain boundaries of the magnet body. The magnet body consisting of a Neodymium-Iron Boron alloy (NdFeB) is sintered first by common methods known in the art. After forming the magnet body in a first step, the magnet body is covered with a protective layer on its outer surface where heavy RE properties are undesired whereas areas with heavy RE properties are desired are not covered with the protective layer on the periphery, i.e. the outer surface of the magnet body on a second step. In a third step, heavy RE materials are deposited on the surface of the magnet body that is not covered by the protective layer e.g. via vapor containing Dysprosium. The magnet is then annealed at higher temperatures to enable diffusion of heavy RE along the grain boundaries inside the magnet body. Diffused Dy replaces the Nd in NdFeB grains and the expelled Nd atoms form a continuous layer around the newly formed (Nd, Dy)FeB grains. Such layers also magnetically isolate the grain form the neighboring grains. By this procedure inside the magnetic body a first region having different magnetic properties compared to the second region, i.e. the region proximate to the outer surface/periphery of the magnet body. This process ultimately leads to the improvement of the coercivity for more than 50% without changing the remanence compared to a magnet body produced according to the first step only.

A first problem of that method resides in that the second region can only be at the surface of the body. A second problem of that method resides in that only second regions having a thin overall thickness can be realized. As a result, the design freedom of the second region of the magnet is very limited.

Another approach resides in employing an additive manufacturing method. Additive manufacturing is an emerging technology, which allows the manufacture of complex shaped parts in a layer-wise building process directly from CAD design data. This makes it an attractive manufacturing method especially for complex shapes in a very short time period from the design to the final component. For metals, the building of components can be achieved in a powder bed by employing either a laser beam (SLM: Selective Laser Melting) or an electron beam (EBM: Electron Beam Melting). The method received much attention recently. However, at the moment there are only a limited number of materials (in total roughly below 20 different materials) available and known, which can be produced by this method.

A substantial limitation of today's SLM and EBM methods for metals resides in that the chemical alloy composition and the material microstructure cannot be varied and controlled locally (in small volume elements at the microstructural level). Therefore, it is not possible to build 3D designed, multicomponent microstructures during the building process of the 3D component.

Another approach for producing a permanent magnet is disclosed in WO2013/185967A1. The method according to this approach uses a focused energy beam (laser beam or electron beam) for the selective sintering of powders. The main target of the process is to conserve both the original microstructure and the morphology (shape) of the powder particles of the feedstock. This is achieved by selecting in the sintering process a temperature-time combination, which only leads to the formation of sintering necks between powder particles, thus avoiding microstructural changes (e.g. grain growth, recrystallization) within the particles, and avoiding a change of the morphology of the particles. This means, that the method is naturally limited to a early stage of sintering, where only sintering necks are formed. In this early stage of sintering, substantial densification of the powder by volume shrinkage and pore filling does not occur. Therefore, the described method always leads to a high amount of residual porosity in the final microstructure. Typical values are above 30 to 40 vol. % of porosity.

A major disadvantage of this method resides in that undesired changes in the crystal microstructure and morphology of the particles can only be achieved by the cost of a high residual porosity, for example a magnetic porosity of 30 vol. %. In an embodiment of WO2013/185967A1, a further non-metallic material such as glass or a polymer is added at a fraction below 10 wt. % (weight percent) such that the spherical morphology and microstructure of the magnetic particles remains conserved. That method leads to microstructures and properties, which are similar and comparable to polymeric bonded magnets. In addition the method has the disadvantage of generating a material with very low mechanical strength and toughness, due to the high porosity. In addition, as the particles are connected by sintering necks in a three dimensional network, eddy currents cannot be efficiently reduced, because of high conductivities in the sintering necks. Therefore, the porosity does not improve significantly eddy current losses. Compared to conventionally sintered, dense magnets, the energy density (BH)max and the mechanical performance of magnets obtained by WO2013/185967A1 is low. Thus, magnets of WO2013/185967A1 need more volume for the same performance compared with conventionally sintered, dense magnets. This is a substantial drawback for all kinds of applications (especially for electrical machines), where compact designs with high energy densities are preferred.

Polymer bonded RE magnets consist of magnetic particles (based on RE permanent magnets) in a polymer matrix. With polymer bonded RE magnets the limitation of very simple magnet geometries can be partly overcome, as e.g. injection molding or other polymer shaping methods can be applied. However, these magnets have the drawback of substantially lower magnetic performance (lower energy density, lower polarization, lower coercivity), as those magnets contain a high amount of polymer (typically far above 30 vol. %). Furthermore, the mechanical properties (strength, creep), and maximum operation temperature are substantially lower compared to sintered RE permanent magnets.

Soft magnetic materials play a key-role for electrical applications in transformers, motors, and generators. Various material grades in different alloy compositions are available, like polycrystalline (e.g. Fe, Fe—Si, Ni—Fe, Co—Fe base), amorphous (e.g. Fe—B—Si, Fe—Ni—B—Si, Fe—Si—B—P—Nb), and nanocrystalline (e.g. Fe—Cu—Nb—Si—B) materials. Due to their moderate cost, crystalline Fe—Si based electric sheets (with typ. 3% Si) are widely used in both non-oriented and grain-oriented grades. In order to reduce eddy current losses magnetic cores are usually built up of a laminated stack of many thin sheets (typical. sheet thickness 0.3-0.5 mm). Sheets are produced by elaborate hot and cold rolling mill technology combined with heat treatment steps. The sheets are stamped to the desired dimension and electrically isolated by applying a ceramic or polymer layer between the sheets. The laminated stack has to be mechanically clamped or bonded by an adhesive in a useful way. The whole process of building a laminated core from thin sheets is elaborate, time-consuming and costly. In addition, the stamping process or any deformation of the electric sheets degrades the magnetic properties. Therefore, additional annealing treatments have to be performed to partly recover the initial properties by a release of generated internal stresses. It is known, that core losses can be reduced in general by reducing the thickness of the sheets to a minimum of typ. 0.1 mm. However, this has the drawback of additional cost and complexity in the manufacture of a laminated magnetic core. Rapidly solidified amorphous and nanocrystalline SM materials offer the lowest core losses and provide the highest energy efficiency. A main drawback of these materials is their high material and production cost. In order to achieve an amorphous or nanocrystalline state, the molten material is rapidly solidified from the liquid state at very high cooling rates (typically 104-106 K/s). This can be achieved only by casting very thin ribbons (typ. 20-50 μm) on a rotating copper wheel. As a drawback it is elaborate and costly to produce magnetic cores based on this very thin ribbons. Another drawback of amorphous and nanocrystalline soft magnet materials resides in their typically high susceptibility to corrosion. To protect the ribbons from corrosion and to lower eddy current losses, ceramic or polymeric coatings of the individual ribbons have to be applied.

Summing up, a fundamental drawback of today's soft magnet core technology is the elaborate and costly manufacturing process, which is a consequence of the layered sheet material concept. Moreover, only comparatively simple/basic core geometries can be manufactured, which limits the degree of freedom in design of advanced, more energy efficient electrical devices drastically.

GENERAL DISCLOSURE OF THE INVENTION

An object of the present invention resides in providing a magnet that allows for more design freedom of the first region and the second region and for realizing more complex geometries of the magnet body than for conventional magnets.

This object is achieved by a magnet according to the following basic embodiment having a magnet body that comprises a first region with first magnetic properties. A second region with second magnetic properties that are different to the first properties. The location of the first region and the second region within the magnet body is freely predeterminable.

Owing to the new method the magnet is produced, the design freedom of the magnet body is increased tremendously. Compared to known magnet manufacturing methods it becomes possible to allocate the second region just there where it is actually needed once built in an electrical device, such as a motor for example. Depending on the size and shape of the second region compared to the first region, it becomes possible to reduce the RE content of rare earth elements in the magnet body drastically such that the overall cost of the magnet body can be drastically lowered. Also spatially more extended second regions than for the known magnet bodies can be realized with essentially no extra effort.

A second advantage resides in that the overall magnetic performance (efficiency) of a magnet body according to the present application can be way higher than a conventionally produced magnet body having the same outer dimensions as will be explained by way of an example. During transient conditions, field pulses tend to reduce the flux in magnet to negative values relative to magnetization direction. The eddy currents flowing in the distal ends, i.e. the end regions of a magnet body having an elongated shape protect a central region in between the end portions from that pulse. The downside of such a protection resides in that the distal ends of the magnet body are sacrificed in that they will be demagnetized after a certain amount of time in use of the electric device such that they cannot contribute to the overall magnetic performance any longer. In conventional electrical devices that inevitably led to the consequence that the magnet body had to be designed larger than actually required in order to ensure a satisfactory long-lasting use of the electric device. Entirely different thereto allows the new magnet to allocate the second region in the area of the distal ends and the first region in the center area. If the second region has a higher coercivity than the first region in this example, the distal area does not need to be sacrificed to such a large extent for ensuring the required minimal magnetic performance also after a long lifetime of the electric device. As a consequence, it becomes possible to lower the overall dimensions of the magnet body compared to the aforementioned conventional magnet body or to enhance the overall magnetic performance if the same outer dimensions of the aforementioned conventional magnet body are available in the electric device. As one can see, the present magnet body can contribute essentially to a miniaturization of electric devices.

Expressed in more general terms, the first region having at least one of a coercivity and a remanence value that is different from the value of the second region can be designed such that only a minimal RE content is required also in high end applications.

For tuning the magnetic performance it has been proved advantageous that the first region has a different microstructure than the second region. More precisely, it has been proved that magnets having an average size of magnetic grains in the first region which is larger than an average size of magnetic grains in the second region are desirable.

Notable satisfactory results in terms of achievable magnetization values have been accomplished if the average size of magnetic grains in the first region is at least 20% larger than the average size of magnetic grains in the second region. Since a difference of the average size of magnetic grains in the second region to the first region proved a strong measure, very satisfactory magnets can be realized if the average size of magnetic grains in the first region is at least 50% larger than the average size of magnetic grains in the second region.

Besides the size of the magnetic grains in the first region and the second region it proved that also the overall average shape of the magnetic grains plays a role. Expressed more generically, it is advantageous in view of the overall magnetic performance if the average shape of magnetic grains in the first region is different to an average shape of magnetic grains in the second region. Notable satisfactory results in terms of achievable magnetization values have been accomplished if the average shape of magnetic grains in the second region is at least 30% more elongated with respect to the average shape of the magnetic grains in the first region. The elongated average shape of magnetic grains in the second region can also be referred to as of columnar shape of magnetic grains. An alternative description of the term 'elongated' may reside in that the average magnetic grains in the second region have a ratio of a longest dimension with respect to its gravity center to a shortest dimension with respect to the gravity center of at least 2:1.

The new manufacturing method also allows to tune the magnet body such that the chemical composition of the first region differs from the chemical composition of the second region. That way, it becomes possible that the magnetic grains in the first region have a different chemical composition than the magnetic grains in the second region. Depending on the requirements, the second region is located at the periphery of the magnet body and may comprise a chemical element like Dysprosium that confers the second region with better coercivity properties than the first region located surrounded by the second region, for example.

Depending on the embodiment the second region can be an edge region or a corner region of the magnet body. Also a combination thereof can be realized. The term 'corner region' is understood as an area of the magnet body extending along a border or ridge where several shell surfaces meet one another. Different thereto, the term 'edge region' is understood as a region extending over a shell surface of the magnet body, e.g. over two lateral surfaces that are arranged opposite to one another.

The new manufacturing method also provides for an essentially free grading. Compared to known diffusion techniques where rare earth elements are brought in peripheral regions of the magnet body, it becomes possible now to design the thickness of the second region way more freely. Depending on the required magnetic properties of the magnet, a second region depth of the second region extending perpendicularly to a surface of the at least one of an edge region and a corner region of the magnet body is at least 1 mm, in embodiments at least 3 mm, and in yet other embodiments at least 8 mm.

As in many cases, it is desirable that the magnet body has particular, i.e. graded magnetic properties only on all of its lateral surfaces but not on its bottom surface and its top surface. Good results are achievable if the magnet body is substantially of prismatic overall shape having a rectangular cross-section with a body length and a body width when seen from a direction in which a body thickness extends, i.e. the building direction. The second region is substantially tubular and has a ring-shaped cross-section when seen from the direction in which the body thickness extends rectangular cross-section. The term ring-shaped shall not be interpreted narrowly such as to encompass only circular cross-sections, but broadly to cover also polygonal cross-sections. The outer contour of the ring-shaped cross section matches an outer contour of the rectangular cross-section. A smallest ring thickness does not deviate more than 20% to the body thickness of the magnet body. The term 'smallest ring thickness' is understood as a minimal direction of the ring-shaped second region at its thinnest spot. Examples are not limited to cuboid like geometries, and apply to more complex shapes of the magnet body.

Similar to the situation known from transformer applications or the like, it may be desirable to tune not only the magnetic properties, but also the insulation properties. This can done in that at least one of the first region and the second region comprises an electrically insulating layer within at least two neighboring internal layers of the first region and/or the second region, respectively. The term 'layer' is used as it has a comparatively large surface and a comparatively small thickness. Depending on the chemical and physical properties of the electrically insulating layer, it can be employed for tuning of the magnetic path in that it assists the guiding of the flux lines. An advantage of such insulation layers resides in that the formation of eddy currents can be suppressed or at least hampered in an operating state of the magnet. Suppressing or at least hampering/limiting the formation eddy currents in an operating state of the magnet is particularly advantageous in soft magnet applications.

The planar extension as well as the thickness of the insulation layer depends on the intended application of the magnet.

Depending on the intended properties, the electrically insulation layer comprises an electrically insulating synthetic material, a metal oxide, a metal carbide, a metal nitride, a ceramic, a glass or even a mixture thereof. It is further possible to build a magnet having two different insulating layers. Whether these layers are directly applied on top of one another or whether there are several layers of magnetic grains located in between two identical or similar insulation layers depends on the requirements on the magnet.

Way higher coercivity values than in conventional sintered magnet bodies are available if the first region or the second region or the first region as well as the second region has/have a filling degree of magnetic grains per a given volume of at least 85 percent by volume, i.e. at least 85% of the theoretical density per given volume. In yet other words, the voids in the given volume can consume maximally 15% for the given volume. Superior coercivity and remanence properties are achievable if the filling degree of magnetic grains per a given volume is of at least 95 percent by volume. Such filling values are way above filling values for laser sintered magnet bodies.

All the above advantages are achievable in that the magnet body is produced by selective laser melting (SLM), by electron beam melting (EBM), by spark plasma sintering (SPS), by laser cladding, by plasma powder cladding or by thermal spraying. Each of these production methods leaves specific properties in the magnet body which allows a detection of the manufactory method once the magnet body is produced.

The above-mentioned production process further allows to form magnets of almost any shape. Up to now, the overall shape of the magnetic body was limited to comparatively primitive and basic geometries. Now, it is possible to design a magnet such that it has a free-form shape. Examples of such free-form shapes are arc-shapes, magnets with a mushroom-shape cross section and the like that are different from box-shaped magnet bodies known from the vast majority of electric devices known to the applicant at the time of filing this application.

Expressed in other words, the above manufacturing methods enable full flexibility of contour, shape and size design. Although some methods like SPS may have more restrictions, complex shapes such as geometries with one axial direction as needed in motors are perfectly feasible.

The above manufacturing methods also allow for realizing sandwiched layer sequences that could not been realized with conventional manufacturing methods at all, especially not in an economic way. In an exemplary embodiment of a magnet body, the first region is formed as a first block, wherein the second region is formed as a second block, and wherein the second block is attached to the first block. The term 'block' shall not be understood in a narrow way to encompass only cuboidal shapes. Each of these blocks comprises a plurality of layers. Moreover, the sequence of blocks is not limited to the vertical (i.e. in the manufacturing sequence of the 3D building method) or in the horizontal extending transversally thereto. In addition, also hybrid embodiments having horizontally as well as vertically extending layer sequences can be realized now.

In case of permanent magnets additional properties are achievable, such as explained below.

Advantageous magnets are achievable if the first region comprises a hard magnet on the basis of a member of a first group, the first group comprising one of compositions a) to g), whereas said composition a) contains Aluminum, Nickel and Cobalt (AlNiCo);
b) contains Samarium and Cobalt (SmCo);
c) contains Samarium and Iron (SmFe);
d) contains Samarium, Iron and Nitrogen (SmFeN);
e) contains Iron and Nitrogen (FeN);
f) contains Manganese, Aluminum and Carbon (MnAlC);
g) contains Manganese, Tin and Cobalt (MnSnCo);
h) contains Manganese and Bismuth (MnBi);
g) contains hard ferrite;
h) contains RE, Iron and Boron (REFeB);
i) contains RE and Iron and Carbon (REFeC).

Particularly inexpensive magnets are achievable if the member of a first group is composition a) or e) or g).

Hard ferrites like Strontium ferrites [$SrFe_{12}O_{19}$ ($SrO.6Fe_2O_3$)] are often used in small electric motors, micro-wave devices, recording media, magneto-optic media, telecommunication and electronic industry. Barium ferrites, $BaFe_{12}O_{19}$ ($BaO.6Fe_2O_3$) a common material for permanent magnet applications. Barium ferrites are robust ceramics that are generally stable to moisture and corrosion-resistant. They are used in e.g. loudspeaker magnets and as a medium for magnetic recording, e.g. on magnetic stripe cards. Cobalt ferrites, $CoFe_2O_4$ ($CoO.Fe_2O_3$), are used in some media for magnetic recording.

Where desired, the second region may contain a hard magnet on the basis of a member of a second group, whereas said second group comprises all members of the first group that are absent in the first region. In an exemplary embodiment, the first member comprises AlNiCo and the second member comprises NdFeB.

In an advantageous embodiment with respect to the overall costs of a magnet, the first region comprises a composition with a first member of RE, Iron and Boron (REFeB), wherein the first member of RE is one or several rare earth element/elements of the Lanthanide series. The first member does not contain all elements of the Lanthanide series. The second region comprises a composition with a second member of RE, Iron and Boron (REFeB), wherein the second member of RE comprises at least one rare earth element of the Lanthanide series that is absent in the first member.

Where required, the second region may comprise an additional chemical element like Co, Ti, Zr for enhancing corrosion resistance, if the second region is encompassing the first region in full, for example.

Since heavy rare earth elements (HRE) provide for even higher coercivity and remanence values than the remaining elements of the Lanthanide series it is advantageous if the second member of RE comprises at least one heavy rare earth element (HRE).

Moreover, inexpensive magnets are achievable if the first member of RE comprises Cerium (Ce), Neodymium (Nd) or both Ce and Nd.

As an alternative, the first region of a magnet comprises a hard magnet on the basis of a member of the first group formed by the composition comprising RE, Iron and Boron (REFeB) while the second region comprises a hard magnet on the basis of the same member of the first group as the first region. In this embodiment, wherein a weight percentage of the RE in the second region is at least 20% higher than the weight percentage of the RE in the first region.

Good magnets are achievable if the average magnetic grain size of the second region is below 4 micrometers, whereas the average magnetic grain size of commercial magnetic grains is currently larger than 10 micrometers.

Irrespective of the fact that the magnet is of soft magnetic type or of permanent magnetic type, its properties can further be graded as follows.

For soft magnets it is advantageous if the average magnetic grain size of the first region is below 20 nm or is above 50 micrometers.

Not only in soft magnet applications, but also in permanent magnet applications, it can be desirable, if at least one of the first region and the second region comprises a terminating layer at a periphery of the magnet body. That geometrically outermost layer with respect to the magnetic body can be insulating and provide corrosion protection or can be electrically conductive to provide magnetic screening against demagnetization of the second and/or first region via the induced eddy currents and can also be a corrosion protection layer at the same time. Depending on the requirements, the terminating layer can be electrically conducting.

As mentioned above, there are embodiments where at least one of the first region and the second region comprises an electrically insulating layer located in between at least two neighboring internal layers of the first region and the second region, respectively. Such an embodiment may be employed for suppressing or at least hampering/limiting the formation eddy currents in an operating state of the magnet, in particularly in soft magnet applications.

Adding an additional high electrical conductivity layer along the periphery of the magnet may contribute to reduce losses. A further advantage of such an embodiment may reside in that this layer also be formed along the contour/periphery of magnet such that a further step of machining along these edges becomes unnecessary for reaching the final geometry of the magnet body.

In an alternative embodiment, the terminating layer or an additional terminating layer is electrically insulating. Such a terminating layer can be made of a plastic or ceramic material for ensuring a corrosion protection of the magnet body in that a protective coating is formed. In yet another alternative the magnetic body may comprise both an electrically conducting layer for reducing the negative effects of a demagnetizing field to the magnet body as well as a yet further additional terminal layer made forming a plastic or ceramic enclosure on top for ensuring corrosion protection of the magnet body.

Regardless, whether the magnet is a soft or a permanent magnet, SM or a PM, it is beneficial if the magnet body has a structure that is one of a polycrystalline microstructure, an amorphous microstructure and a nanocrystalline microstructure.

The polycrystalline microstructure comprises at least one of Iron (Fe) and an iron alloy comprising at least one of compositions i) to v), whereas composition
i) contains Iron and Silicon (Fe—Si),
ii) contains Nickel and Iron (Ni—Fe),
iii) contains Cobalt and Iron (Co—Fe),
iv) contains Iron and Aluminum (Fe—Al),
v) contains Iron, Aluminum and Silicon (Fe—Al—Si);

The amorphous microstructure in turn comprises an iron alloy comprising at least one of compositions vi) to x), whereas composition
vi) contains Iron, Boron and Silicon (Fe—B—Si),
vii) contains Iron, Nickel, Boron and Silicon (Fe—Ni—B—Si),
viii) contains Iron, Silicon, Boron, Phosphorus and Niobium (Fe—Si—B—P—Nb),
ix) contains a first element combination of any one of the elements of a third group and a fourth group where the third group contains the elements Cobalt, Iron and Nickel and where the fourth group contains the elements Boron, Silicon and Carbon
x) contains a second element combination of any one of the elements of a fifth group and a sixth group where the fifth group contains the elements Cobalt and Iron and where the sixth group contains the elements Zirconium, Hafnium and Niobium;

Last, the nanocrystalline microstructure comprises an iron alloy containing Iron, Copper, Niobium and Boron.

In case of soft magnets additional properties are achievable, such as explained below.

The manufacturing process allows for more advanced soft magnets to be built having a magnet body that has a structure being at least one of a polycrystalline microstructure, an amorphous microstructure and a nanocrystalline microstructure.

Owing to the rapid change of the coercivity of many compositions in a range of a grain size of the magnetic grains between about 10 nm and more than about a 100 µm, it proved advantageous in turns of a high permeability (i.e. a low coercivity) if an average magnetic grain size in the first region is either less than 20 nm or more than 50 µm, and wherein the second region has an average magnetic grain size of 100 nm to 1 µm. That holds true at least for compositions with the chemical elements Fe—Cu—Nb—Si—B; Fe—Nb—Si—B; Fe—Co—Zr; Ni—Fe of 50 wt %; Ni—Fe of 80 wt %; and Si—Fe with 6.5 wt %.

Next, there are also applications where both soft magnetic or semi-hard magnetic as well as permanent magnetic properties are desired. In an exemplary embodiment of such a magnet, the first region has either a coercivity of less than 1 kA/m or a coercivity of more than 1 kA/m but less than 10 kA/m, whereas the second region has a coercivity of more than 10 kA/m.

Up to now, the only way to produce such hybrid magnets resided in that the soft and the hard/permanent magnet had to be produced separately of one another and then assembled to the desired magnet body in a further step. In contrast thereto provides the new manufacturing method disclosed later in this description for an economic way to produce the desired magnet body in essentially one go.

If an electric device is fitted with any one of the above-mentioned magnets, the effects and the advantages of the latter will apply for the electric device as well. In exemplary embodiments, the electric device may be an electric motor, a generator, a power transformer, an instrument transformer, a magnetic actuator, a linear motion device, a magnetically biased inductor device or the like.

In case of the instrument transformer, the ability to reduce magnet losses allows for an increase linear range of those devices, for example.

Next, a number of methods for producing the above-mentioned magnets is disclosed.

In a most basic embodiment of the method of producing a magnet having a magnet body comprising a first region with first magnetic properties and a second region with second magnetic properties that are different to the first properties, the method comprising the following steps:

a) forming a first layer belonging to the first region by depositing a plurality of first powder portions on a first predetermined area of the magnet to be built each, and by fusing the plurality of first powder portions to one another such that magnetic grains are formed;

b) forming a second layer belonging to the second region by depositing a plurality of second powder portions on a second predetermined area of the magnet to be built each, and by fusing the plurality of second powder portions to one another such that magnetic grains are formed;

c) forming a third layer belonging to the first region on top of the first layer in a building direction of the magnet by depositing a plurality of first powder portions on a third predetermined area of the magnet to be built each, and by fusing the plurality of first powder portions to one another such that magnetic grains are formed;

d) forming a forth layer belonging to the second region on top of the second layer in the building direction of the magnet by depositing a plurality of second powder portions on a fourth predetermined area of the magnet to be built each, and by fusing the plurality of second powder portions to one another such that magnetic grains are formed;

The term 'fusing' shall not encompass a neck sintering only such as known from conventional laser sintering processes.

Depending on the actually three-dimension building device dedicated for carrying out the forming of the magnet body as well as on the desired properties of the magnet body, a thickness of the first layer, the second layer, the third layer and the fourth layer thickness is in the range of 20 to 200 micrometers.

Where required, the first layer and the second layer are arranged side-by-side with respect to the building direction of the magnet. Alternatively, the first layer and the second layer are on top of one another with respect to the building direction of the magnet.

The depositing of the first powder portions and the depositing of the second powder portions can be performed economically by way of a powder bed. In case that the forming method is spark plasma sintering (SPS), the term 'powder bed' is understood as comprising all kinds of material depositions, regardless how this is built up in a die.

An economically feasible production of magnets is achievable if the depositing of the first powder portions and the depositing of the second powder portions is performed by way of a first deposition head of a dedicated three-dimension building device. The term '3D printer' is occasionally used for designating the three-dimension building device.

Good forming results are achievable if the fusing is achieved by local melting of powder particles of the first powder portions and the second powder portions by one of a laser beam, an electron beam, an ion beam, a plasma beam. Again, the term 'fusing' shall not encompass a neck sintering only such as known from conventional laser sintering processes.

It turned out to be advantageous in some applications, if the powder bed is preheated before fusing the plurality of first powder portions and the second powder portions. Preheating could be particularly beneficial for all these methods including SPS and cladding (e.g. laser cladding), because preheating is helpful for controlling the grain size and phase formation, reduced energy requirement for local fusing as well as for reducing thermomechanical stresses.

In case of SPS, the fusing is achieved by applying a mechanical load on the first powder portions and the second powder portions and passing a high electrical current through the first powder portions and the second powder portions. In an exemplary embodiment, a mold may be employed that has the following features. First, an outer mold that defines the periphery of the magnet body. Second a parting wall that delimits a radially inner section of the mold cavity from a radially outer section of the mold cavity when seen in the building direction such that a sub-cavity having a ring-shaped cross-section is created. The ring-shaped cross section does not need to be of circular type. Many polygonal shapes are conceivable. Third, a first powder portion comprising NdFeB is filled into the inner section of the cavity within the parting wall. Fourth, a second powder portion comprising (Nd,Dy)FeB is filled into the sub-cavity having a ring-shaped cross-section. Fifth, the partition wall is removed. Next, a high electrical current through the first powder portions and the second powder portions such that the powder portions not only fuse into a solid body each but also fuse to one another to a single magnet body.

Alternatively, it is conceivable to build the magnet body in a die layer by layer, e.g. in that a bottom supporting structure of the die is movable in the building direction.

Where required, the manufacturing method may further comprise a step of exposing the first powder portions and the second powder portions or the fused first powder portions and the second powder portions to a magnetic field. That external magnetic field can be present before and/or during and/or after the consolidation to affect the nucleation/orientation process of the magnetic grains.

For conferring the magnet with even more advanced magnetic properties, the manufacturing method may further comprise a step of arranging an electrically insulating layer in a predetermined further area of the magnet to be built
a) in between the first layer and the third layer; or
b) in between the second layer and the fourth layer; or
c) in between the first layer and the third layer as well as in between the second layer and the fourth layer, or
d) in between the first layer and the second layer; or
e) in between the third layer and the fourth layer; or
f) in any combination of a) to e).

The term 'insulation layer' is employed because of the comparatively large surface to the thickness ratio of the layer. The layer-wise formation of the magnet body allows for a tailored tuning of insulation properties as well as of the magnetic paths in a magnet. These measures may be taken for suppressing or at least hampering/limiting the formation eddy currents in an operating state of the magnet, in particular in a soft magnet application.

In case of electrically insulating layer extending in the direction of the building direction, they may be arranged such that they indent with the neighboring first to fourth layers such that good mechanical properties of the magnet body are still achievable.

An efficient and yet quick way of disposing the material for establishing the electrically insulating layer is achievable if the step of arranging an electrically insulating layer is performed by way of a second deposition head of a dedicated three-dimension building device. The material for forming the electrically insulating layer deposited by the second deposition head can be solid (e.g. a powder), liquid or by vapor deposition, or by ion plating, for example.

In a preferred embodiment of the manufacturing method, at least one of the first region and the second region has a filling degree of magnetic grains magnetic grains per a given volume of at least 95 percent by volume. That way, magnets having particular strong magnetic properties are achievable.

If required, the manufacturing method may have an additional step of arranging at least one terminating layer at a periphery of at least one of the first region and the second region.

Depending on the intended purpose and on other conditions like interfering magnetic fields in an operating state of the magnet once built in an electric device, the terminating layer is electrically conducting or electrically insulating. Moreover, it is possible to apply an electrically conducting layer first and an electrically insulating layer, e.g. for corrosion protection, on top of the electrically conducting layer.

BRIEF DESCRIPTION OF THE DRAWINGS

The description makes reference to the annexed drawings, which are schematically showing in FIG. 1 a general display of the method for producing a basic first embodiment of a magnet according to the present invention;

FIG. 7 a general arrangement of a second set-up of a first region and of a second region in the magnetic body;

FIG. 8 a general arrangement of a third set-up of a first region and of a second region in the magnetic body;

FIG. 9 a general arrangement of a fourth set-up of a first region and of a second region in the magnetic body;

FIG. 9a a general arrangement of a variation of the fourth set-up of a first region and of a second region in the magnetic body;

In the drawings identical items as well as items of identical functions are given identical reference characters.

WAYS OF WORKING THE INVENTION

Figure 1:
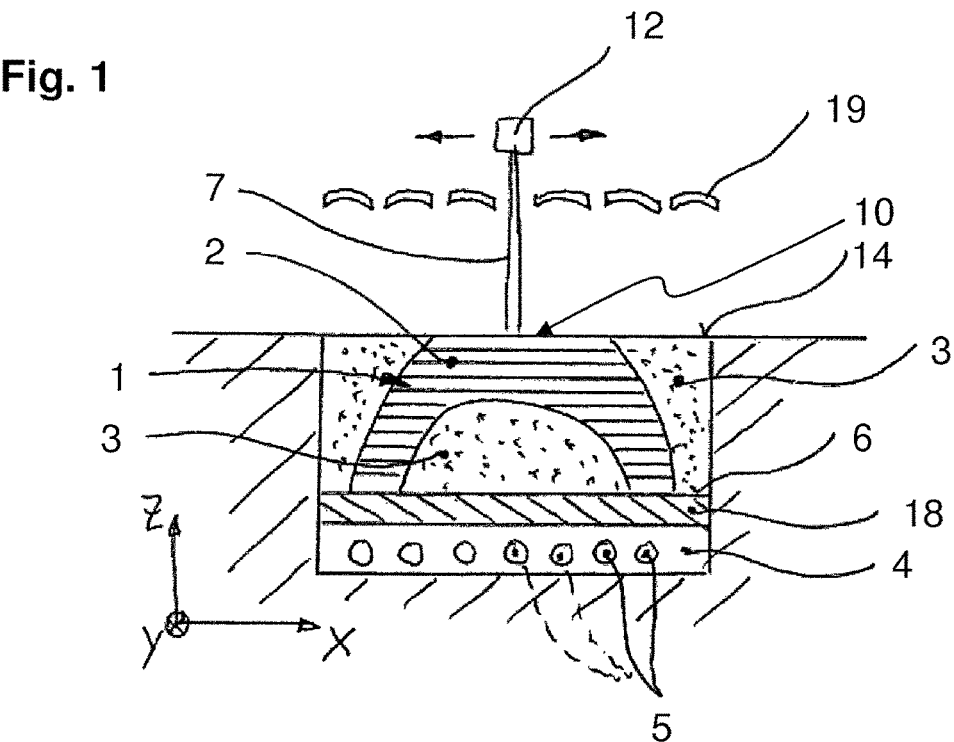

In FIG. 1, a magnet 1 having a free-form shaped magnet body 10 is manufactured by way of applying a plurality of layers 2 layer-wise on top of another such that the uppermost layer is bonded locally by an energy beam in a building direction Z to a neighboring, underlying and adjacent layer at least to some extent. A powdery substance 3 is used for supporting the magnet body 10 during the manufacturing process. The powdery substance is not boded to the magnet 1 during the manufacturing process.

The manufacturing process requires a mold structure having a base 4 with a plurality of cooling and heating elements 5 that can be controlled independently of one another such that a first surface temperature 6 can be selected instantaneously at the spot in the X-Y direction depending on the temperature gradient required. A laser beam 7 is turning a layer 13 of a first powder composition 8 comprising rare earth elements as well as Iron and Boron into first magnetic grains 9. For an improved control of the microstructure during solidification of the melt pool, an alloy-specific temperature gradient and cooling rate is applied and kept constant throughout the whole building process. The temperature gradient is applied predominately in the building direction Z. At solidification of the melt pool 16, the cooling rate is kept at a constant level during the whole building process. Cooling rates are preferably kept at values typically above 104-105 K/s. This is achieved by controlling the temperatures of both the support structure layer 18 and of the top powder layer of the powder bed 13 in the building chamber. The support structure layer 18 is cooled below room temperature or heated above room temperature by thermoelectric elements of the cooling/heating element 5 or by a suitable liquid medium. The top powder layer 13 is heated above room temperature by optical radiant heaters 19 or any other appropriate method. In combination with variation and control of the laser beam parameters (e.g., beam energy, size of focal spot, dwell time, speed in X-Y-direction.

Although in this section examples the use a focused laser as energy source is proposed, an electron beam can be used as an alternative, too. In the case of a laser beam, the process is conducted under a protective, inert gas atmosphere (such as Argon, for example). In the case of an electron beam, the process is conducted under vacuum.

RE is Neodymium with about 30 wt %. FIG. 1 reveals along with FIG. 2 that the layer thickness of the powder composition 8 of the first powder bed 13 measured in the direction Z and applied by a first deposition head (not shown in FIGS. 1 and 2, but being similar to a second deposition head shown and explained with reference to FIGS. 3 and 4 later on) corresponds to a layer thickness 15 of a first layer 2 produced by the number of magnetic grains 9 of the same layer, i.e. the magnetic grains having the same height level in the building direction Z (see FIG. 4 for the layer thickness 15).

Although the first powder composition 8 of the first powder bed 13 is shown in FIG. 1 to have a mixture of globular larger powder particles having the same diameter like the layer thickness 15 as well as smaller powder particles having a way smaller size, one has to know that this display of the first powder composition 8 in FIG. 1 and all subsequent figures of this application is a simplified one. That simplification is done for illustrating schematically the fusing process of the magnetic grains 9 and the formation of the layers 2 in melt pool 16 stepwise. In reality, the first powder composition 8 comprises a plurality of not necessarily globular powder particles having a powder grain size of about 20-150 µm and the powder bed 13 has a lower packaging density than the densified layer of magnetic grains 9. Expressed in other terms, the minimum thickness of magnetic grains 9 correlates with the particle size of the powder composition 8.

The laser beam 7 emerges from a printing head 12 that is movable at least in the X-Y-direction and fuses the plurality of first powder portions provided by the first deposition head to one another in the X-Y and Z-direction such that first magnetic grains 9 are formed in a melt pool 16. As evident from FIG. 2 the first magnetic grains 9 grains are designated to have a magnetization direction that corresponds preferably to a magnetic orientation displayed by double-headed arrows 17 in each of the first magnetic grains 9.

Returning to FIG. 1, the mold structure further has a support structure layer 18 provided in between the base 4 and the magnet body 10 once produced.

Moreover, heating elements such as optical radiant heaters 19 are provided for preheating the powder bed 13 before fusing the plurality of first powder portions together by the laser 7.

Figure 2:
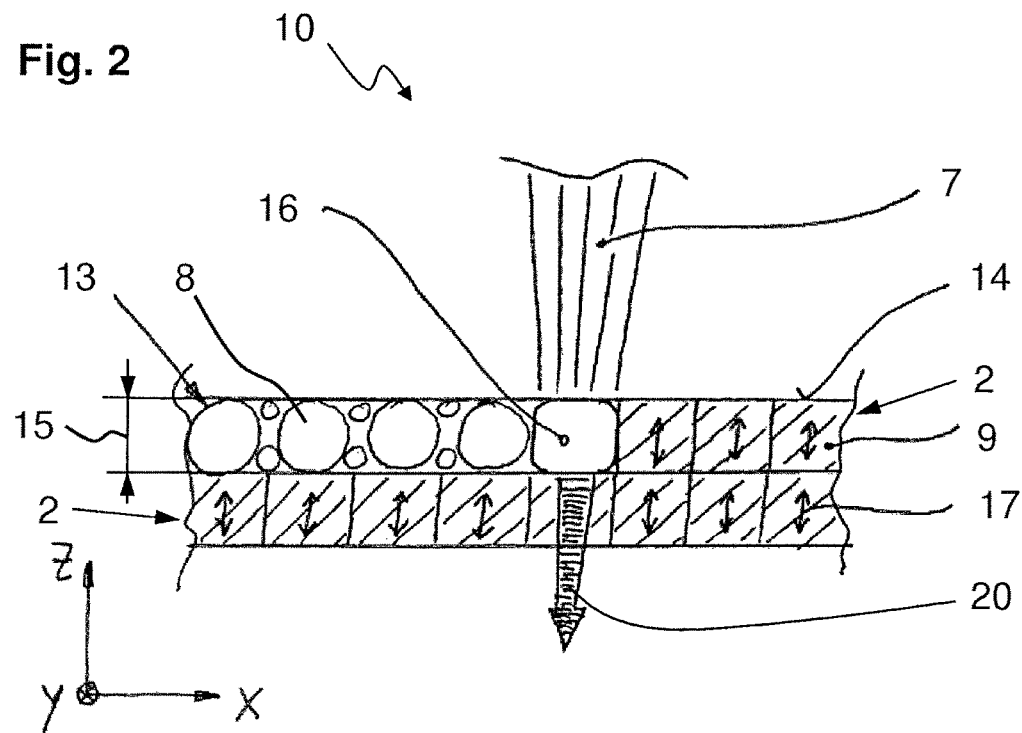
FIG. 2 a microscopic display of a method for producing the magnet of FIG. 1 showing the forming of magnetic grains.

FIG. 2 further reveals a heat flow 20 displayed as a hatched arrow extending from the melt pool 16 towards the base 4. The melt pool 16 has a cooling rate that is controlled to be constant.

Because a first layer 2 belonging to a first region having first magnetic properties owing to the first powder portions as well as a second layer belonging to a second region having second magnetic properties owing to second powder portions having different magnetic properties than the one of the first region are present (not shown in FIGS. 1 and 2) the magnet body 10 has two different magnetic properties provided within its single contour.

The filling degree of magnetic grains relative to the given volume is 95 percent by volume, i.e. 95% of the maximal theoretical density. Materials processed by this exemplary method exhibit such a dense microstructure, because of the total melting of powder particles and resolidification of the melt-pool. Measured densities are well above 95%, most of the time above 98% of the theoretical density. The microstructure of processed materials exhibit a very pronounced texture with grain orientation in the Z-direction. The minimum dimension of grain-orientation in z-direction correlates with the dimension of the powder layer thickness. For achieving very long, oriented grains in Z-direction, the laser beam movement is controlled in such a way, that the laser pattern matches exactly with the pattern of underneath layers.

The described, exemplary method of the present disclosure has several advantages compared to the state-of-the-art. It allows the production of magnets with complex geometries, which cannot be achieved by known methods, at much lower manufacturing cost. It consequently enables improved designs of electrical devices (e.g., motors, generators, transformers, etc.) with respect of maximum performance and an optimum energy efficiency. The design of the device can be optimized by using numerical software for multiphysics simulation of the involved magnetic, electric, thermal, and mechanical phenomena. The result of such a numerical design study is an optimum shaped magnet. A CAD software model is made for the optimum magnet shape. The magnet is directly produced from the CAD software model by the exemplary method of the present disclosure. This has an advantage of a cost effective and fast processing of a final magnet component. In case of RE-based permanent magnet materials, the cost effectiveness is better compared to prior art solutions because the many powder metallurgy processing steps can be avoided. Materials processed by the exemplary method of the present disclosure have a substantially higher chemical purity, as the risk of oxygen pick-up is greatly reduced by performing one (e.g., only one) processing step under Argon. In the case of soft magnet materials, the elaborate and costly procedure of sheet production and subsequent assembly to a magnet core can be avoided, which leads to substantially reduced production time and cost. Further important advantages are achieved with respect to the microstructure and properties of the processed magnets. As a consequence of the highly controlled grain orientation, a very favorable anisotropic texture of the magnet material is achieved. The axis of easy magnetization of the crystals correlate either with the principle z-direction or with the X-Y direction of the building process. Therefore, the obtained anisotropic texture leads to an improved performance of the magnets.

A further advantage is achieved for precipitation hardenable alloy systems. Due to the controlled cooling rate over the whole building volume, a very homogeneous state of oversaturated mixed crystal is achieved. The foreign atoms are at high concentration and distributed homogeneously in the host lattice. This is an optimum precondition for conducting an appropriate precipitation heat treatment step after the building process. By this, very tailored and improved magnetic properties are achieved.

Figure 3:
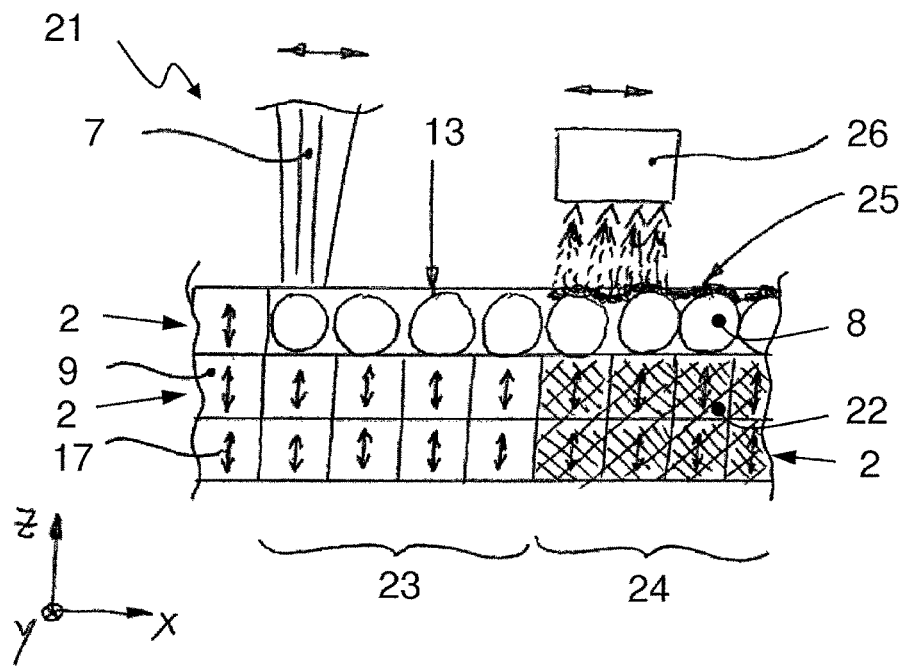
FIG. 3 a microscopic display of the method for producing a second embodiment of a magnet according to the present invention. In this method, magnetic grains are formed that are chemically different to the remaining magnetic grains, e.g. by way of doping and alloying.

The embodiment of the magnet body 21 shown in FIG. 3 differs to the first embodiment of the magnet body 10 shown in FIG. 2 in that it does not only has first magnetic grains 9 belonging to a first region 23, but also second magnetic grains 22 having different magnetic properties than the first grains 9 present in the very same layer 2 with respect to the building direction Z. The second grains belong to a second region 24 of the magnet body 21. The first powder portions of a first powder composition 8 forming the powder bed 13 are deposited on top on a solidified previous layer 2 or on the support structure layer by way of a first deposition head again. The first powder composition 8 comprises REFeB, wherein RE is Neodymium with about 30 wt % for forming the first magnetic grains 9 are chemically the same as those for forming the second grains 22.

The difference of magnetic properties is achieved by depositing a suitable amount of a powdery substance 25 formed by Dysprosium, i.e. a dopant on top of the powder bed 13 only in that area that is designated to be turned into the second region 24 once fused by the laser beam 7. The depositing of the powdery substance forming a dopant 25 is performed by way of a second deposition head 26 that is movable at least in the X-Y direction, and by the doping process proceeds in the melting pool 16. That way, magnetic grains having 6 wt % Dy are achievable.

The second deposition head 26 is movable in X-Y direction and enables a secondary building job. The operation of the second deposition head 26 is coordinated with the laser operation and with the application of new powder layers (e.g. the primary building job for forming the powder bed 13). Software, for example, controls both the primary and secondary building jobs. The second deposition head 26 places locally material either on the already solidified, solid layer 2 or on the powder layer 13, depending on the requirement and in a another embodiment. In any case, the deposited material can be placed at any desired area in the X-Y building surface. The resolution of the printing head material deposition (e.g. the secondary building job) is at least in the range of the powder particle size of the primary building job. In an exemplary embodiment, the local resolution of the second deposition head material deposition is significantly higher than the powder particle size of the primary building job. The thickness of the deposited material in the secondary building job can be varied according to the requirement. For magnetic materials, only comparatively thin layers in the range of 0.1-5 µm, for example, can be deposited. The second deposition head can use any known deposition technology. It was found to use, for example, a fluid medium in order to deposit the material in form of droplets. The fluid medium can be, e.g. a colloidal dispersion of solid particles in a liquid medium, an inorganic precursor, a sol, an ink or the like. In the case of using a dispersion, the particle size is typically in the range of 1 µm or below.

In an exemplary embodiment, the temperature of the support structure layer (top layer of primary building job) is kept at an elevated temperature to ensure a very quick removal of the dispersion medium. This is achieved by, for example, by the optical radiant heaters 19, which are controlling the surface temperature 6.

The deposition head can deposit at least one kind of material. However, if it seems beneficial for achieving the desired properties of the finally built object, the deposition head can deposit different materials during the secondary building step. This has the advantage, that different materials can be introduced locally into the microstructure of the primary building step. The method of the present disclosure opens up a very high degree of freedom in the 3D design and building of microstructures of multi-component materials. By this it is possible to tune locally the functional properties of the desired object at the microstructural level directly from the CAD model of the object. In a further exemplary embodiment, alloying elements can be introduced, which react to new phases with the particles of the primary building job during laser melting and resolidification, or the alloying element can diffuse and segregate at grain boundaries. The laser energy and focal spot size is adjusted in order to build either dense layers, which have been deposited on solid substrate surface areas, or to form new alloy phases, which result from the deposition of material at powder substrate. In general, all metallurgical concepts can be applied locally at a microstructural level. Especially melt formation (when the melt pool is created by the focused laser beam), controlled rapid solidification (when the laser is moved to another spot), and the possibility of heat treatment after the building process have to be considered in order to take full advantage of the exemplary method of the present disclosure.

By this, functional properties like e.g. electrical conductivity, thermal conductivity, hardness, strength, corrosion resistance, refractive index, magnetic saturation polarization, magnetic coercivity, Curie temperature, and many more can be tuned locally at a microstructural level directly from a CAD model of the desired object.

For the example of magnetic materials, the secondary building job is used to introduce alloying or doping elements at places in the volume of the magnet, where they are needed. In an exemplary embodiment, a heavy rare earth metal (e.g. Dy) is introduced at locations only, where high demagnetization fields are present. This has the advantage of minimizing the total amount of Dy needed. Magnets produced by this way are substantially cheaper, because of the significantly lower amount of Dy consumed for achieving the same performance and temperature stability in the final application of the magnet. Other alloying elements can be introduced to locally improve the mechanical strength, toughness, and corrosion resistance in areas where needed for the final application.

Figure 4:
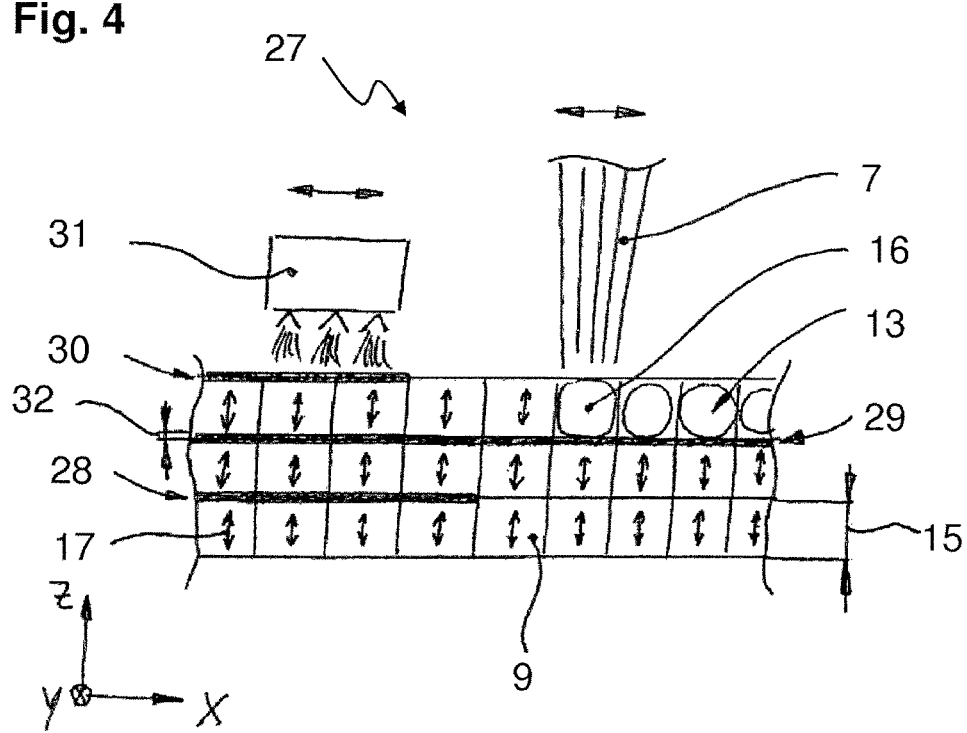
FIG. 4 a microscopic display of the method for producing a third embodiment of a magnet according to the present invention. In this method, a local deposition of various materials is performed for forming a thin insulation layer in between neighboring layers.

The further embodiment of a magnet body 27 shown in FIG. 4 differs to the first embodiment 10 shown in FIG. 2 in that there is a first electrically insulating layer 28, a second electrically insulating layer 29 and a third electrically insulating layer 30 provided in between subsequent layers and on top of the top layer of magnetic grains produced last when seen in the building direction Z.

The material required for building the insulation layers 28, 29, 30 is deposited on top of first magnetic grains 9 by way of a further deposition head 31 that dispenses a portion of liquid polysilazane polymer on top of the first grains 9, once they are solidified, in order to form a precursor of a ceramic. After cross-linking of the liquid polysilazane polymer, it is decomposed and the polysilazane is turned into a ceramic layer with known means. Depending on the requirements, the layer thickness 32 of the first electrically insulating layer 28, a second electrically insulating layer 29 and a third electrically insulating layer 30 is in a range of 0.1 µm up to about 1 µm.

Expressed in more general terms that are not limited to the embodiment shown in FIG. 3, it can be very advantageous for magnetic materials to introduce thin layers (typically 0.1-5 µm) of an electrically isolating material, preferably a ceramic (e.g., oxide, nitride, carbide, etc.). By this, eddy current losses can be effectively avoided and the efficiency of the electric device is significantly improved. In volume areas, where a high concentration of induced eddy currents would be present, the density of isolating layers is increased by introducing more layers in the same local volume zone. By this, eddy currents are very effectively suppressed at volume zones where needed only. In consequence, a minimum of non-magnetic material is introduced, which maximizes the volume of active magnetic material in the total volume of the magnet. This is an important advantage for both soft and hard magnetic materials. In the case of soft magnetic materials, the present disclosure enables the direct production of magnetic cores with functionally graded layer architecture. It is a much faster, less elaborate, and cheaper technique compared to the state of the art. Finally, the present disclosure enables higher efficiency of devices, improved magnetic performance, reduced production cost, and the like.

Figure 5:
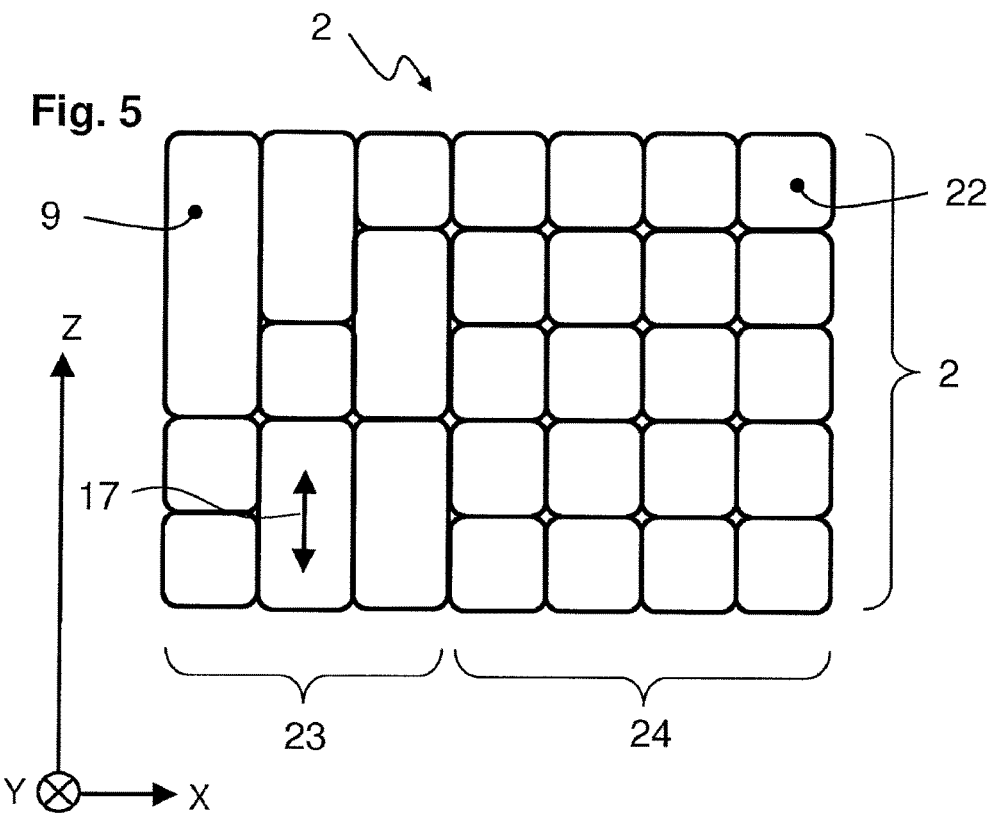
FIG. 5 a morphology and microstructure of a fourth embodiment of a magnet according to the present invention showing a cutout of a layer comprising larger and columnar magnetic grains.

Next let us revert to the morphology and microstructure of a fourth embodiment of a magnet according to the present invention shown in FIG. 5. The soft magnet shown in FIG.

5 shows a close up of a single layer 2 formed in the building direction Z having a thickness of about a 100 µm. In this embodiment of a manufacturing method, the first powder composition was used both for forming the first magnetic grains 9 as well as the second magnetic grains 22.

On the left side of FIG. 5 one can see that the first magnetic grains 9 are mostly larger and columnar in the first region 23 whereas they are mostly cuboid with a quite quadratic cross-section in the X-Z direction in the second region 24. In this embodiment of a manufacturing method, the different grain sizes and orientations of the magnetic grains have been caused by different printing parameters applied to the different regions 23, 24. The columnar first magnetic grains 9 contribute to lower coercivity and thus to a higher permeability, while the smaller grains in the second region 24 have a lower permeability.

In a variation of this method, the second magnetic grains 22 do not need to be produced by a variation of the printing parameters but by a dedicated powder bed based on a second powder composition than the one used for forming the first magnetic grains 9.

Figure 6:
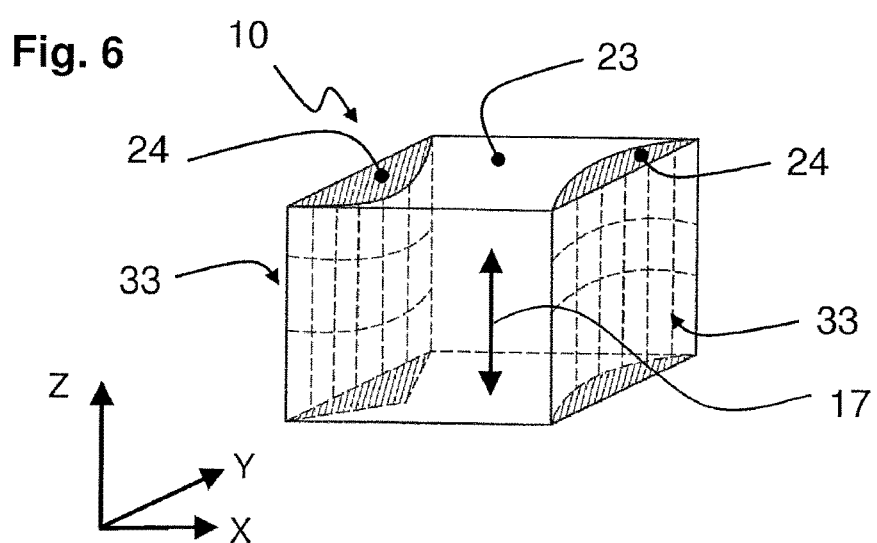
FIG. 6 a general arrangement of a first set-up of a first region and of a second region in the magnetic body.

The general arrangement of a first set-up of a first region 23 and of a second 24 region in the magnetic body 10 shown in FIG. 6 reveals that the magnet body 10 is of cuboid overall shape and has two opposing lateral surfaces that form edge regions 33. The second region 24 is arranged along that edge regions 33. When seen in the building direction Z, the second regions 24 have a wedge-shape cross section. The first region 23 is located in between the two second regions 24. The magnetic orientation of the grains is again indicated by a double-headed arrow 17.

The general arrangement of a second set-up of a first region and of a second region in the magnetic body 10 shown in FIG. 7 reveals that the magnet body 10 is of cuboid overall shape and has two opposing surfaces that are delimited in the Y-Z-direction by two corners or edges 34, each. Compared to the embodiment shown in FIG. 6, the second regions 24 of this embodiment extend only along these corners or edges 34 and not over the whole end regions 33.

The general arrangement of a third set-up of a first region and of a second region in the magnetic body 10 shown in FIG. 8 reveals that the magnet body 10 is of cuboid overall shape. In this embodiment, the magnet body 10 has a sandwich construction where a block forming the first region 23 is arranged in between two neighboring blocks forming the second regions 24 when seen in the building direction Z. Each of those blocks comprises a plurality of layers 2.

The general arrangement of a fourth set-up of a first region and of a second region in the magnetic body 10 shown in FIG. 9 reveals that the magnet body 10 is of cuboid overall shape. In this embodiment, the magnet body 10 has a more complex design where a cuboid-shaped first region 23 having smaller outer dimensions than the magnet body 10 is located entirely within the second region 24. Expressed in other terms, the first region 23 is located entirely in the interior of the magnet body 10 while the whole periphery of the magnet body 10 is formed by the second region 24.

A variation of the magnet body according to FIG. 9 is shown and explained with respect to FIG. 9a. The first region 23 is extended in the building direction Z such that it hits a bottom surface 35 and a top surface 36 of the magnet body.

Again, the magnet body 10 is substantially of prismatic overall shape having a rectangular cross-section (in the X-Y-plane) with a body length 53 and a body width 54 when seen from a building direction Z in which a body thickness 55 extends. The second region 24 is substantially tubular having a ring-shaped cross-section when seen from the direction in which the body thickness 55 extends, wherein an outer contour of the ring-shaped cross section matches an outer contour of the rectangular cross-section (both extending in the X-Y-direction). The smallest ring thickness 56 does not deviate more than 20% to the body thickness 55 of the magnet body 10.

Figure 10:
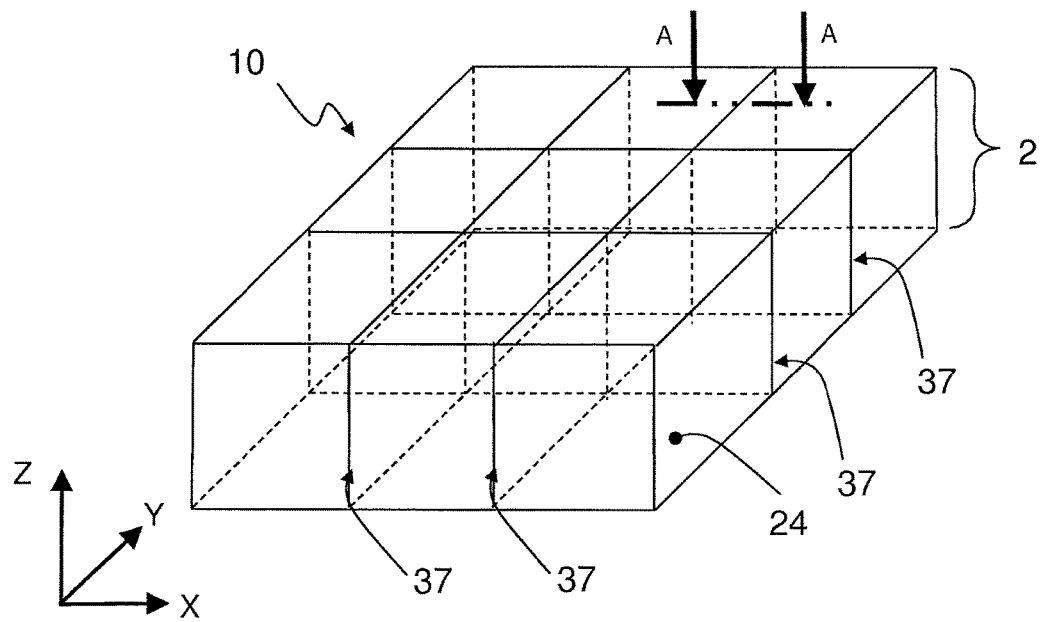
FIG. 10 a general arrangement of a fifth set-up having electrically insulating layers in between of magnetic grain areas of the magnetic body in one layer.
Figure 11:
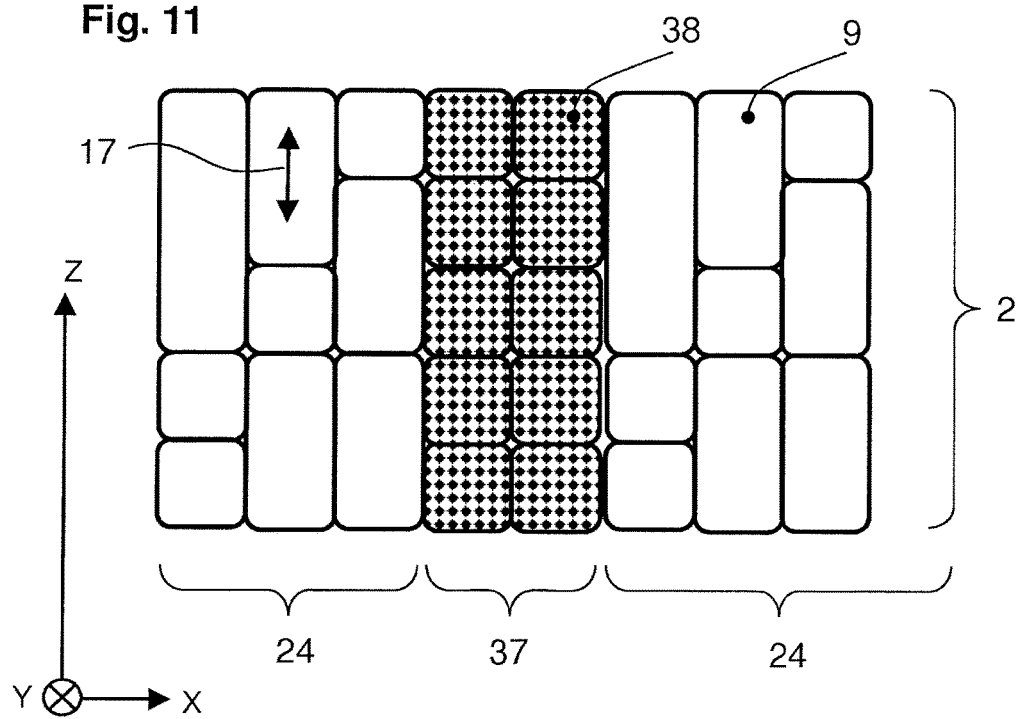
FIG. 11 a magnified cut-out through the layer along line A-A of FIG. 10.

Next, a general arrangement of a fifth set-up of a magnet body 10 having several electrically insulating layers in between of laterally neighboring magnetic grain areas is explained along with FIG. 10 and FIG. 11. The slice of a magnet body 10 shown in FIG. 10 shows a portion of a single layer 2. The magnet body 10 has a plurality of electrically of internal electrically insulating layers 37 extending in the direction of the building direction Z and in the X-direction or in the Y-direction.

Although it is possible that the magnetic body 10 has not only first magnetic grains 9 but also different, second magnetic grains as well, the aspect of the vertical insulating layers 37 will be explained by an embodiment having only first magnetic grains for simplicity.

The close-up shown in FIG. 11 through the layer along line A-A of FIG. 10 displays that a vertically extending electrically insulating layers 37 is provided in between two neighboring second regions 24 having first magnetic grains 9, each. The first powder composition for forming the first magnetic grains 9 comprises REFeB, RE is Neodymium with about 30 wt %. As to the particle size see FIG. 2.

The third grains 38 of the electrically insulating layer 37 are formed of the very same first powder composition as the first grains 9 but they are heavily doped with Iron (e.g. 10 wt % iron) deposited on the powder bed before the fusing process with the laser beam 7 similar to what is disclosed in FIG. 3. As a result of this treatment, the electric and the magnetic properties of the third grains 38 have been destroyed or at least heavily lowered compared to the first magnetic grains 9 such that the desired electrically insulating effect in the X-Z and in the Y-Z direction is achieved.

However, the mechanical rigidity of the magnet body in the area of the electrically insulating layer 37 is not affected excessively, because there is still a metallic bonding of the third grains 38 to the first grains 9 in the lateral directions X and Y.

The magnetization direction and the direction of flux perturbation is extending in the building direction Z.

Figure 12:
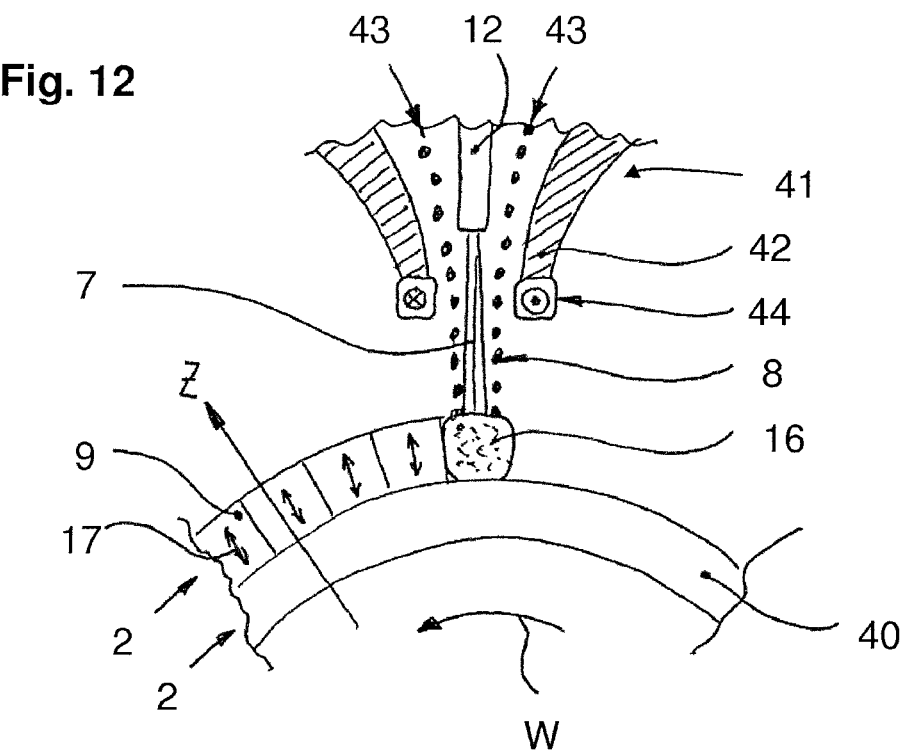
FIG. 12 a schematic display of the method for producing a sixth embodiment of a magnet according to the present invention.

Next, a schematic display of the method for producing a sixth embodiment of a magnet according to the present invention is explained with respect to FIG. 12. Contrary to the embodiment explained in FIG. 1 and FIG. 2, this method employs a building structure that is not based on a common Cartesian coordinate system having X-Y- and Z-directions but on a drum-like, or more arbitrary building structure having a curved shell surface which rotates stepwise about an axis (not shown) in a direction W. Nonetheless, the building direction Z as well as the grain orientation 17 having a microstructural texture extends bottom-up, i.e. from a radially inner area to a radially outer area.

The layer 2 is presently created on top of a substrate 40 (that might well be formed by an earlier produced layer 2 having identical magnetic grains 9 as the radially outer layer 2). In this production method, also referred to as laser cladding, laser metal deposition or blow powder technology, the powder bed is not deposited on the solidified lower layer 2 or the substrate 40 (for example formed in an embodiment by a laminated core) well ahead of the actual fusion in a melt pool 16 caused by laser beam 7, but step-wise by a carrier gas transporting the first powder composition 8 to the melt pool 16. The deposition of the first powder composition 8 as well as of the energy source for the laser beam 7 is done by a combined printing head 41. The combined printing head has a printing head 12 and an annular hollow nozzle 42 led around the printing head 12 such as to form a funnel. The solidified magnetic grains have a microstructured texture extending in the Z-direction. A suitable gas stream 43 of Argon, for example, comprising a predefined amount of the first powder composition 8 as the one mentioned in the context of FIG. 2 is directed coaxially to the laser beam 7 through the nozzle 42 to the melting pool 16 or to the place of the melting pool to be formed next.

As an option of this manufacturing method, an electric coil 44 may be arranged at an end of the nozzle 42 for exposing the first powder composition 8 to an external magnetic field such that a particle and crystal orientation during the deposition is achievable. This measure is not limited to this embodiment and is applicable to more complex surfaces and deposition structures.

Figure 13:
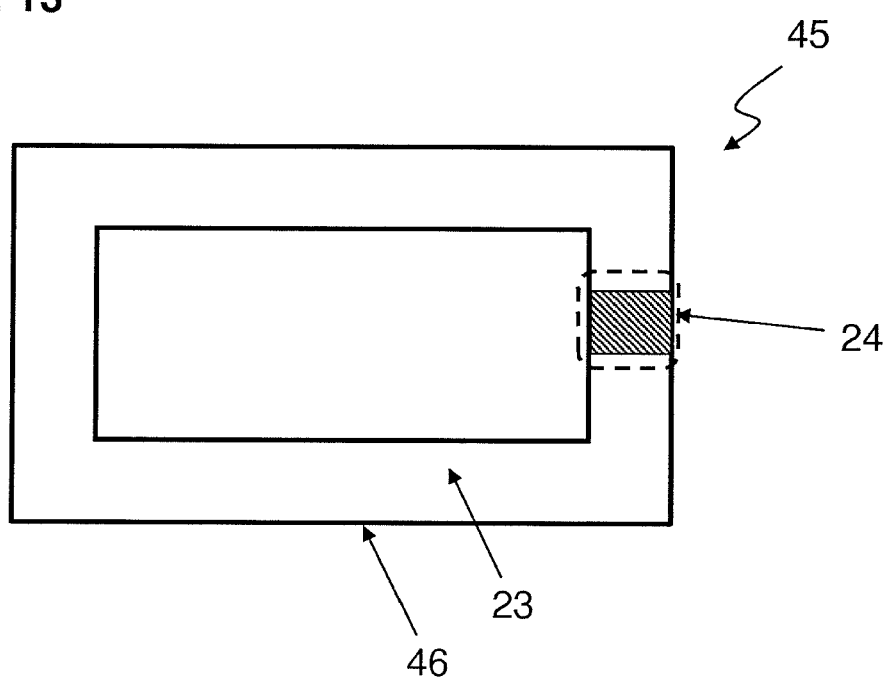
FIG. 13 a front view of a circular magnetic core element forming a first embodiment of an electric device.

Next, a first embodiment of an electric device 45 is shown and explained with reference to FIG. 13. FIG. 13 shows a ring-shaped magnetic core element 46 having both first region 23 having soft magnetic properties as well as a second region 24 having hard magnetic properties. The new manufacturing technique allows for producing the magnet body 10 layer wise such that both the soft magnetic first portion and the hard magnetic body are produced in the substantially same manufacturing process. Such a magnet body 10 may be employed in the reactor arrangement for an alternating current such as disclosed in EP2104115A1, for example.

Figure 14:
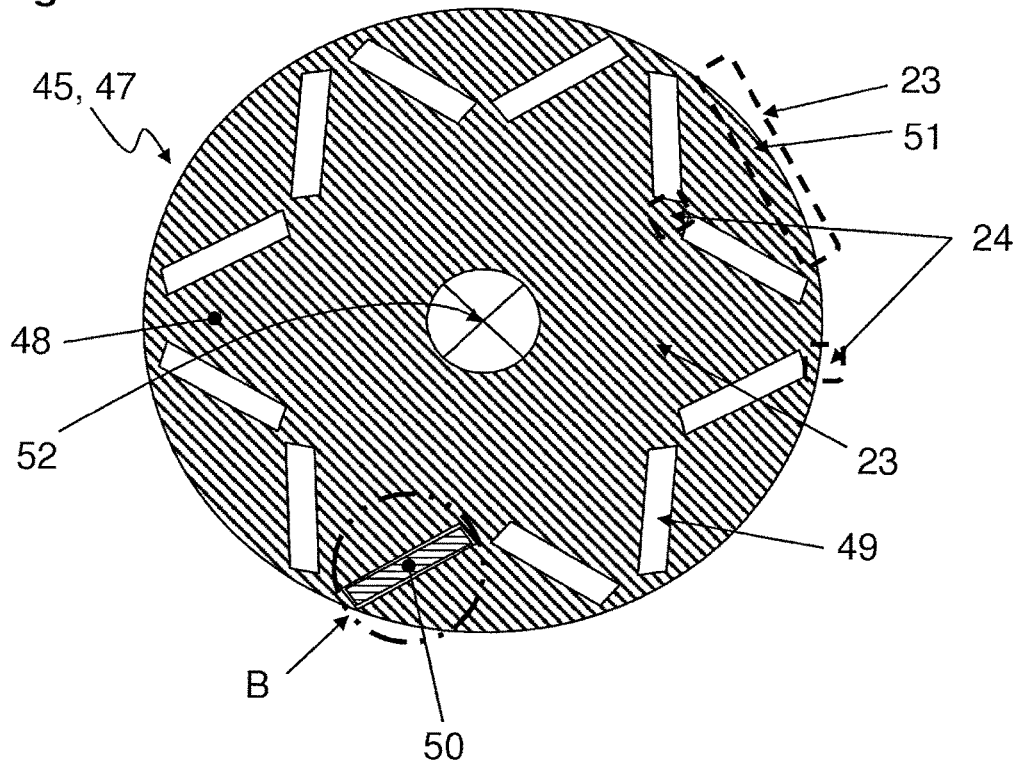
FIG. 14 a schematic cross-section through an electric motor forming a second embodiment of an electric device.

A second embodiment of an electric device 45 is shown and explained with reference to FIG. 14 and FIG. 15. FIG. 14 shows a cross-section through a rotor 47 of an electric motor. The rotor 47 comprises a carrier section 48 with a plurality of slots 49 extending in the direction of the rotating axis having soft magnetic properties. Such a rotor design is known from the so-called Synrel or Syn-Reltype. The slots 49 are designed to receive permanent magnets 50 having a matching cross-section. Except in area "B" the permanent magnets 50 have not been shown in FIG. 14 for ensuring that the parts and geometries can be recognized better. FIG. 14 shall not be as a full example covering all demands and approaches to material composition along the portions of the geometry. Variations with multiple layers of magnets, different orientations and shapes of magnets may also be considered.

FIG. 14 further discloses that the overall soft magnetic carrier section 48 has a polycrystalline first region 23 for forming a low coercivity region in an operating state of the electric motor. Losses as well as conductivity do not matter in this first region 23. The grain size of the magnetic grains comprising Iron and Silicone (Fe—Si), or a Fe—Co, or Fe—Ni, or similar soft magnetic compositions in this region in the core of the component, the grain sizes are below about 20 [nm] or above 50 [μm]. A lamination with electrically insulating layers (28, 29, 30) such as explained in the context of the embodiment in FIG. 4 are not needed.

The carrier section 48 further has a peripheral area or rim area 51 with respect to a rotation axis 52 of the rotor 47. Said rim are 51 is subject to high mechanical stresses as well as high magnetic flux variations. The rim area corresponds to relatively low coercivity but high permeability region, but is in need of a loss managing featuring laminated polycrystalline structures or microstructures that are nanocrystalline or amorphous. The laminated polycrystalline structures are formed as explained in the context of FIG. 4 where the production of electrically insulating layers 28, 29, 30 is disclosed. The grain size of the magnetic grains in this rim area 51 is below about 20 [nm] (nanocrystalline or amorphous) or above 50 [μm] (with lamination). Therefore, the rim area 51 qualifies as a further first region 23 in the context of this disclosure. Having the above-mentioned grain structure in the rim area 51 is further advantageous as it contributes to a high mechanical rigidity that is very desired in that comparatively small zone at the periphery of the magnet body of the rotor 47.

The carrier section 48 further has intermediate areas located in between neighboring slots 49 as well as in between peripheral ends of the slots 49 and the shell surface of the rotor 47 forming so-called bridges.

A bridge is needed to restrain the permanent magnet 50 and pole structure and secure it to the rotor 47. Thus, for mechanical considerations, the bridge is desired to be as thick as possible. The downside is, that a thicker bridge magnetic flux to not cross the air gap of the electric machine and therefore adds to the overall costs of the machine since an increased permanent magnet is required for compensating that disadvantage. It needs to be mentioned that the demands on the soft magnetic side here are independent of whether there are hard magnets 50 being placed on the rotor 47 of the machine or not. If hard magnets 50 are used, the bridges would have to be thicker than in applications where no hard magnets are present. This is because of the increased centrifugal forces. However, the overall demands and desires will remain for soft magnetics.

Now returning to the embodiment of FIG. 14, one portion of this intermediate area is located at a base of the V-shape formed by the slots 49, which intermediate area is nearest to the rotation axis 52, there is a need of a high coercivity and a low permeability. Accordingly, the grain size of the magnetic grains in this area is chosen to be in a range of about 100 nm to about 1 μm. Therefore, that intermediate area qualifies perfectly as a second region 24 in the context of the present disclosure. As a result, the aforementioned magnet production methods traverse the present problem that larger Synrel type machines are not feasible because they would require larger pole numbers and thus exceed known structural limitations owing to increased bridge widths required for sustaining increased centrifugal forces and the resultant reduction of magnetic anisotropy. Contrary thereto, the present method allows for building such larger Synrel machines now because it forms an opportunity for building sufficiently strong bridges. Owing to no reduction of the anisotropy or even an increased anisotropy higher saliency ratios of the electro motor is achievable.

Figure 15:
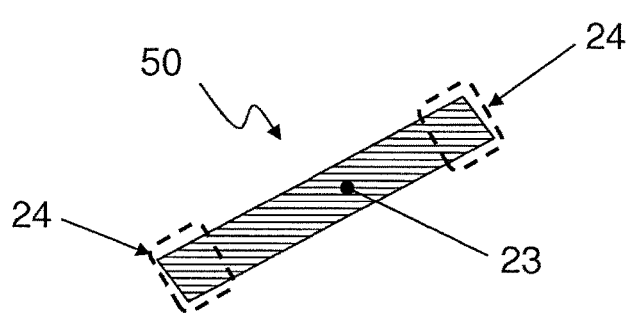
FIG. 15 a magnified view of area B in FIG. 14 showing a permanent/hard magnet body.

A close up of the hard or permanent magnet 50 in section "B" of FIG. 14 is provided in FIG. 15. The elongated cross-section of the permanent magnet 50 is produced similar to the embodiment of the magnet body discussed with respect to FIG. 8. However, in the present hard magnet embodiment the areas for meeting the high coercivity requirements are located at opposite, i.e. distal ends 24 of the magnet body 50 with respect to a central, i.e. proximal first region 23 having comparatively low coercivity requirements.

LIST OF REFERENCE CHARACTERS 1 magnet
2 layer
3 powdery substance
4 base
5 cooling/heating element 6 first surface temperature
7 laser beam
8 first powder composition
9 first magnetic grains
10, 21, 27, 39, 47, 50 magnet body
12 printing head
13 powder bed/layer of powder composition
15 layer thickness
16 melt pool
17 grain orientation
18 support structure layer
19 optical radiant heaters
20 heat flux
22 second magnetic grains
23 first region (low coercivity)
24 second region (high coercivity)
25 powdery substance/ink/dopant
26 second deposition head
28 first electrically insulating layer
29 second electrically insulating layer
30 third electrically insulating layer
31 further deposition head
32 layer thickness of insulating layer
33 edge region
34 corner region
35 bottom surface
36 top surface
37 electrically insulating layer
38 third grains
40 substrate
41 combined printing head
42 nozzle
43 gas stream
44 electric coil
45 electric device
46 magnetic core element
47 rotor of an electric motor
48 carrier section
49 slots
50 permanent magnet body
51 rim area
52 rotation axis
53 body length
54 body width
55 body thickness
56 smallest ring thickness

The invention claimed is:

1. A magnet including a one-piece magnet body comprising
a first region with first magnetic properties,
a second region with second magnetic properties that are different to the first properties, wherein the first region has at least one of a coercivity and a remanence value that is different from the value of the second region,
wherein the location of the first region and the second region within the magnet body is freely predeterminable,
wherein the first region has a different microstructure than the second region,
wherein an average size of magnetic grains in the first region is larger than an average size of magnetic grains in the second region,
wherein the first region comprises a composition with a first member of RE, Iron and Boron,
wherein the first member of RE is a rare earth element of the Lanthanide series,
wherein the second region comprises a composition with a second member of RE, Iron and Boron,
wherein the second member of RE comprises at least one rare earth element of the Lanthanide series that is absent in the first member, and
wherein a region depth of the second region extending perpendicularly to a surface of the magnet body is at least 1 mm.

2. The magnet according to claim 1, wherein the average size of magnetic grains in the first region is at least 50% larger than the average size of magnetic grains in the second region.

3. The magnet according to claim 2, wherein the average magnetic grains in the second region have a ratio of a longest dimension with respect to its gravity center to a shortest dimension with respect to the gravity center of at least 2:1.

4. The magnet according to claim 1, wherein the chemical composition of the first region differs from the chemical composition of the second region.

5. The magnet according to claim 1, wherein the second region is at least one of an edge region and a corner region of the magnet body.

6. The magnet according to claim 1, wherein the second region is at least one of an edge region and a corner region of the magnet body,
and wherein the magnet body is substantially prismatic overall shape having a rectangular cross-section with a body length and a body width when seen from a building direction in which a body thickness extends,
wherein the second region is substantially tubular having a ring-shaped cross-section when seen from the direction in which the body thickness extends, wherein an outer contour of the ring-shaped cross section matches an outer contour of the rectangular cross-section.

7. The magnet according to claim 1, wherein at least one of the first region and the second region comprises an electrically insulating layer within at least two neighboring internal layers of the first region and/or the second region, respectively.

8. The magnet according to claim 1, wherein the magnet body has properties consistent with being produced by selective laser melting, by electron beam melting, by spark plasma sintering, by laser cladding, by plasma powder cladding or thermal spraying.

9. The magnet according to claim 1, wherein the second region contains a hard magnet on the basis of a member of a second group, whereas said second group comprises all members of the first group that are absent in the first region.

10. The magnet according to claim 1, wherein the first member of RE comprises at least one of Cerium and Neodymium.

11. The magnet according to claim 1, wherein the first region comprises a hard magnet on the basis of a member of the first group formed by the composition comprising RE, Iron and Boron, and
wherein the second region comprises a hard magnet on the basis of the same member of the first group as the first region, and
wherein a weight percentage of the RE in the second region is at least 20% higher than the weight percentage of the RE in the first region.

12. The magnet according to claim 1, wherein the average magnetic grain size of the second region is below 4 micrometers.

13. The magnet according to claim 1, wherein the average magnetic grain size of the first region is below 20 nanometers or is above 50 micrometers.

14. The magnet according to claim 1, wherein at least one of the first region and the second region comprises a terminating layer at a periphery of the magnet body.

15. The magnet according to claim 14, wherein the terminating layer or an additional terminating layer is electrically insulating.

16. The magnet according to claim 1, wherein the magnet body has a structure being at least one of a polycrystalline microstructure, an amorphous microstructure and a nanocrystalline microstructure.

17. The magnet according to claim 16, wherein the first region has either a coercivity of less than 1 kA/m or a coercivity of more than 1 kA/m but less than 10 kA/m, and wherein the second region has a coercivity of more than 10 kA/m.

18. An electric device comprising at least one magnet according to claim 1.

19. The magnet according to claim 1, wherein the average size of magnetic grains in the first region is at least 20% larger than the average size of magnetic grains in the second region.

20. The magnet according to claim 1, wherein the second member of RE comprises at least one heavy rare earth element (HRE).

21. The magnet according to claim 1, wherein the region depth of the second region extending perpendicularly to a surface of the magnet body is at least 3 mm.

22. The magnet according to claim 1, wherein the region depth of the second region extending perpendicularly to a surface of the magnet body is at least 8 mm.

23. The magnet according to claim 1, wherein the first region comprises a plurality of magnetic grains and the second region comprises a plurality of magnetic grains.

24. The magnet according to claim 1, wherein the average magnetic grain size of the first region is above 50 micrometers.

25. The magnet according to claim 1, wherein at least one of the first region and the second region has a filling degree of magnetic grains per a given volume of at least 85 percent by volume.

26. The magnet according to claim 1, wherein at least one of the first region and the second region has a filling degree of magnetic grains per a given volume of at least 95 percent by volume.

27. A method of producing a one-piece magnet having a magnet body comprising a first region with first magnetic properties and a second region with second magnetic properties that are different to the first properties, wherein the first region has at least one of a coercivity and a remanence value that is different from the value of the second region, wherein the first region has a different microstructure than the second region, wherein an average size of magnetic grains in the first region is larger than an average size of magnetic grains in the second region, wherein the first region comprises a composition with a first member of RE, Iron and Boron, wherein the first member of RE is a rare earth element of the Lanthanide series, wherein the second region comprises a composition with a second member of RE, Iron and Boron, wherein the second member of RE comprises at least one rare earth element of the Lanthanide series that is absent in the first member, and wherein a region depth of the second region extending perpendicularly to a surface of the magnet body is at least 1 mm, the method comprising the following steps:
   a) forming a first layer belonging to the first region by depositing a plurality of first powder portions on a first predetermined area of the magnet to be built each, and by fusing the plurality of first powder portions to one another such that magnetic grains are formed;
   b) forming a second layer belonging to the second region by depositing a plurality of second powder portions on a second predetermined area of the magnet to be built each, and by fusing the plurality of second powder portions to one another such that magnetic grains are formed;
   c) forming a third layer belonging to the first region on top of the first layer in a building direction of the magnet by depositing a plurality of first powder portions on a third predetermined area of the magnet to be built each, and by fusing the plurality of first powder portions to one another such that magnetic grains are formed;
   d) forming a fourth layer belonging to the second region on top of the second layer in the building direction of the magnet by depositing a plurality of second powder portions on a fourth predetermined area of the magnet to be built each, and by fusing the plurality of second powder portions to one another such that magnetic grains are formed.

28. The method according to claim 27, wherein the fusing is achieved by applying a mechanical load on the first powder portions and the second powder portions and passing a high electrical current through the first powder portions and the second powder portions.

29. The method according to claim 27, further comprising a step of exposing the first powder portions and the second powder portions or the fused first powder portions and the second powder portions to a magnetic field.

30. The method according to claim 27, further comprising a step of arranging an electrically insulating layer in a predetermined further area of the magnet to be built
   a) in between the first layer and the third layer; or
   b) in between the second layer and the fourth layer; or
   c) in between the first layer and the third layer as well as in between the second layer and the fourth layer; or
   d) in between the first layer and the second layer; or
   e) in between the third layer and the fourth layer; or
   f) in any combination of a) to e).

* * * * *